US012583608B2

(12) United States Patent
Durocher et al.

(10) Patent No.: US 12,583,608 B2
(45) Date of Patent: Mar. 24, 2026

(54) ELECTRIC MOTOR PROPULSION SYSTEM FOR AN AIRCRAFT

(71) Applicant: Pratt & Whitney Canada Corp., Longueuil (CA)

(72) Inventors: Eric S. Durocher, Boucherville (CA); Michel Labrecque, Ste-Julie (CA); Todd A. Spierling, Rockford, IL (US)

(73) Assignee: Pratt & Whitney Canada Corp., Longueuil (CA)

( * ) Notice: Subject to any disclaimer, the term of this patent is extended or adjusted under 35 U.S.C. 154(b) by 200 days.

(21) Appl. No.: 18/196,711

(22) Filed: May 12, 2023

(65) Prior Publication Data

US 2024/0375782 A1      Nov. 14, 2024

(51) Int. Cl.
| | |
|---|---|
| *B64D 35/00* | (2006.01) |
| *B64D 27/24* | (2024.01) |
| *B64D 35/021* | (2024.01) |
| *B64F 5/10* | (2017.01) |
| *F16H 57/02* | (2012.01) |
| *H02K 7/00* | (2006.01) |
| *H02K 7/116* | (2006.01) |
| *H02K 7/14* | (2006.01) |

(52) U.S. Cl.
CPC ............. *B64D 35/00* (2013.01); *B64D 27/24* (2013.01); *B64D 35/021* (2024.01); *F16H 57/02* (2013.01); *H02K 7/003* (2013.01); *H02K 7/006* (2013.01); *H02K 7/116* (2013.01); *H02K 7/14* (2013.01); *F16H 2057/02034* (2013.01); *F16H 2057/02043* (2013.01); *F16H 2057/02082* (2013.01)

(58) Field of Classification Search
CPC ...... B64D 35/00; B64D 35/021; B64D 27/24; F16H 57/02; F16H 2057/02034; F16H 2057/02043; F16H 2057/02082; H02K 7/003; H02K 7/006; H02K 7/116; H02K 7/14
USPC .......................................................... 318/15
See application file for complete search history.

(56) References Cited

U.S. PATENT DOCUMENTS

| | | | | |
|---|---|---|---|---|
| 11,384,693 | B2 | 7/2022 | Lefebvre | |
| 2018/0023471 | A1 | 1/2018 | Lefebvre | |
| 2020/0063606 | A1* | 2/2020 | Miller | F02K 5/00 |
| 2020/0080475 | A1* | 3/2020 | Baladi | F02C 3/04 |
| 2021/0179282 | A1 | 6/2021 | Venter | |
| 2021/0355870 | A1* | 11/2021 | Lefebvre | F02C 7/32 |

(Continued)

OTHER PUBLICATIONS

Motoike et al. (PL 212046 B1)Propulsion Device For Hybrid Vehicle Date Published Jul. 31, 2012 (Year: 2012).*

(Continued)

*Primary Examiner* — Jorge L Carrasquillo
(74) *Attorney, Agent, or Firm* — Getz Balich LLC

(57) ABSTRACT

An assembly for a propulsion system of an aircraft includes an electric motor, a first gearbox module, a second gearbox module, and a propeller. The electric motor includes a rotor. The rotor includes a first axial end and a second axial end. The first gearbox module includes a first gear assembly. The first gear assembly is coupled to the first axial end. The second gearbox module includes a second gear assembly. The second gear assembly is coupled to the second axial end. The propeller is coupled to the first gear assembly. The first gear assembly is configured to drive rotation of the propeller in response to rotation of the rotor.

18 Claims, 3 Drawing Sheets

(56)          References Cited

U.S. PATENT DOCUMENTS

2022/0275761 A1      9/2022  Lefebvre
2022/0315376 A1*   10/2022  Maghsoodi .............. B66D 1/74

OTHER PUBLICATIONS

Motoike et al. (PL 212046 B1) Propulsion Device For Hybrid
Vehicle Date Published (Year: 2012).*
EP Search Report for EP Patent Application No. 24175220.3 dated
Oct. 11, 2024.

* cited by examiner

ELECTRIC MOTOR PROPULSION SYSTEM FOR AN AIRCRAFT

TECHNICAL FIELD

This disclosure relates generally to an aircraft propulsion system and, more particularly, to an electric aircraft propulsion system driven by an electric motor.

BACKGROUND OF THE ART

Electric propulsion systems for aircraft may include an electric motor configured to provide thrust for the aircraft. Various electric aircraft propulsion systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for a propulsion system of an aircraft includes an electric motor, a first gearbox module, a second gearbox module, and a propeller. The electric motor includes a rotor. The rotor includes a first axial end and a second axial end. The first gearbox module includes a first gear assembly. The first gear assembly is coupled to the first axial end. The second gearbox module includes a second gear assembly. The second gear assembly is coupled to the second axial end. The propeller is coupled to the first gear assembly. The first gear assembly is configured to drive rotation of the propeller in response to rotation of the rotor.

In any of the aspects or embodiments described above and herein, the rotor may include a rotor body, a first output shaft, and a second output shaft. The rotor body may extend between and to the first axial end and the second axial end. The first output shaft may be disposed at the first axial end. The second output shaft may be disposed at the second axial end.

In any of the aspects or embodiments described above and herein, the first output shaft and the second output shaft may be rotatable about a rotational axis.

In any of the aspects or embodiments described above and herein, the first output shaft and the second output shaft may be rotatable together about the rotational axis.

In any of the aspects or embodiments described above and herein, the first gear assembly may be a reduction gear assembly.

In any of the aspects or embodiments described above and herein, the assembly may further include a plurality of auxiliary loads coupled to the second gear assembly. The second gear assembly may be configured to drive the plurality of auxiliary loads in response to rotation of the rotor.

In any of the aspects or embodiments described above and herein, the plurality of auxiliary loads may include an air compressor.

In any of the aspects or embodiments described above and herein, the electric motor may include a motor housing. The motor housing may extend between and to a first axial end and a second axial end. The motor housing may include a first flange at the first axial end. The first flange may be mounted to the first gearbox module.

In any of the aspects or embodiments described above and herein, the motor housing may include a second flange at the second axial end. The second flange may be mounted to the second gearbox module.

In any of the aspects or embodiments described above and herein, the propeller may be a variable-pitch propeller.

According to another aspect of the present disclosure, a method for forming an electric motor propulsion system for an aircraft is provided. The method includes, for a propulsion system including a first gearbox module, a second gearbox module, and an engine, the first gearbox module including a first gear assembly, the second gearbox module including a second gear assembly, the engine including at least one rotational assembly coupled with the first gear assembly and the second gear assembly, the at least one rotational assembly rotatable about a rotational axis to drive the first gear assembly and the second gear assembly, performing the steps of: removing the engine from the propulsion system and forming the electric motor propulsion system by installing an electric motor in the propulsion system subsequent to removing the engine from the propulsion system and coupling a rotor of the electric motor with the first gear assembly and the second gear assembly.

In any of the aspects or embodiments described above and herein, the at least one rotational assembly may include a first rotational assembly and a second rotational assembly. The first rotational assembly may be coupled to the first gear assembly and the second rotational assembly may be coupled to the second gear assembly.

In any of the aspects or embodiments described above and herein, the rotor may include a first output shaft and a second output shaft. Coupling the rotor of the electric motor with the first gear assembly and the second gear assembly may include coupling the first shaft with the first gear assembly and coupling the second shaft with the second gear assembly.

According to another aspect of the present disclosure, an aircraft propulsion system includes an electric motor, a first gearbox module, a second gearbox module, a propulsor, and a plurality of auxiliary loads. The electric motor includes a rotor rotatable about a rotational axis. The first gearbox module includes a first gear assembly. The first gear assembly is coupled to the rotor. The second gearbox module includes a second gear assembly. The second gear assembly is coupled to the rotor. The propulsor is coupled to the first gear assembly. The first gear assembly is configured to drive rotation of the propulsor in response to rotation of the rotor. The plurality of auxiliary loads are coupled to the second gear assembly. The second gear assembly is configured to drive the plurality of auxiliary loads in response to rotation of the rotor.

In any of the aspects or embodiments described above and herein, the electric motor may include a motor housing. The motor housing may extend between and to a first axial end and a second axial end. The motor housing may include a first flange at the first axial end. The first flange may be mounted to the first gearbox module.

In any of the aspects or embodiments described above and herein, the motor housing may include a second flange at the second axial end. The second flange may be mounted to the second gearbox module.

In any of the aspects or embodiments described above and herein, the rotor may include a rotor body, a first output shaft, and a second output shaft. The rotor body may extend between and to a first axial end and a second axial end. The first output shaft may be disposed at the first axial end. The first output shaft may be coupled to the first gear assembly.

The second output shaft may be disposed at the second axial end. The second output shaft may be coupled to the second gear assembly.

In any of the aspects or embodiments described above and herein, the first output shaft and the second output shaft may be rotatable about the rotational axis.

In any of the aspects or embodiments described above and herein, the first output shaft and the second output shaft may be rotatable together about the rotational axis.

In any of the aspects or embodiments described above and herein, the electric motor may be positioned axially between the first gearbox module and the second gearbox module.

The present disclosure, and all its aspects, embodiments and advantages associated therewith will become more readily apparent in view of the detailed description provided below, including the accompanying drawings.

DETAILED DESCRIPTION

Figure 1:
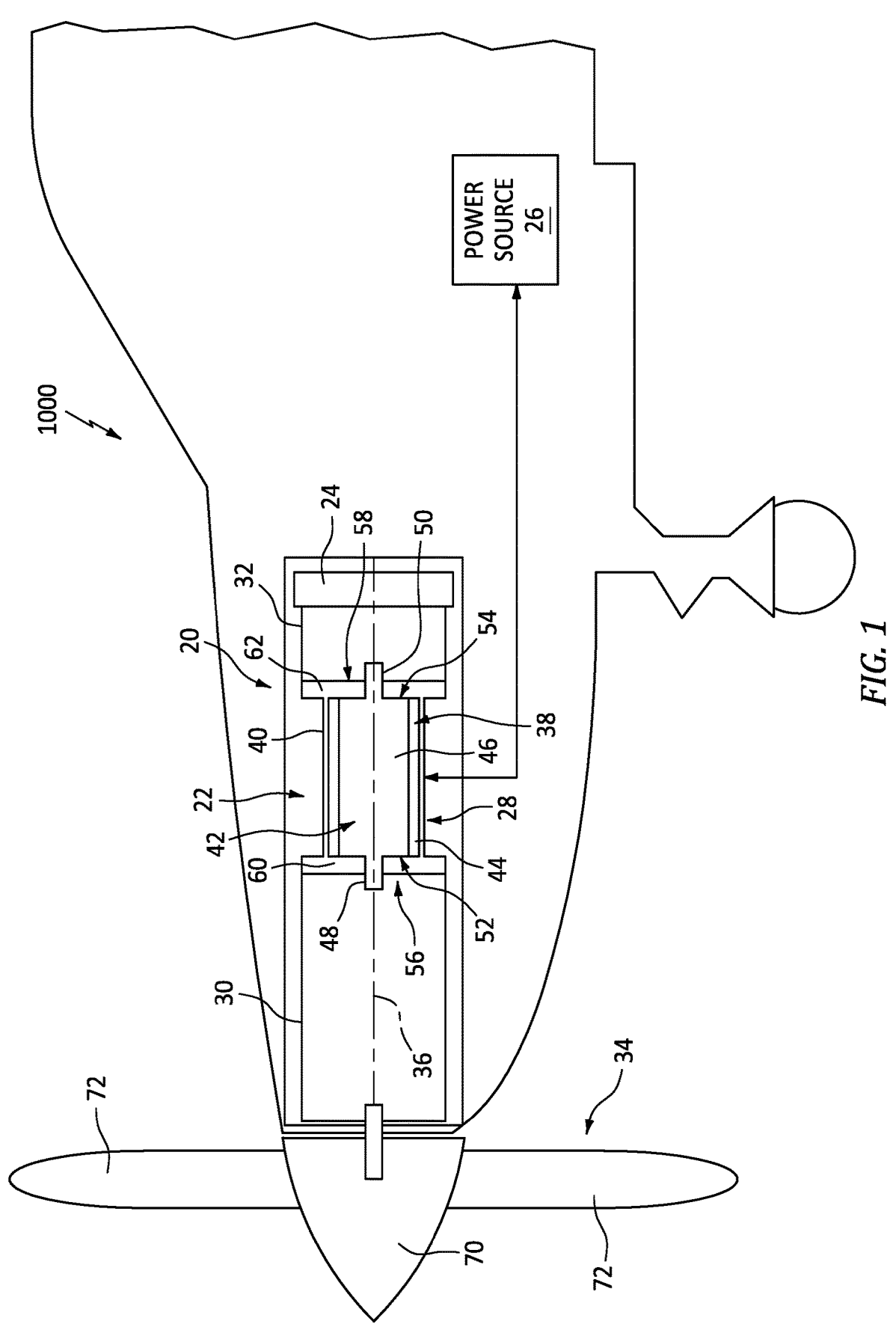
FIG. 1 illustrates a side, cutaway view of a portion of an aircraft including an electric propulsion system, in accordance with one or more embodiments of the present disclosure.

FIG. 1 schematically illustrates a propulsion system 20 configured for an aircraft, such as the aircraft 1000 of FIG. 1. The aircraft 1000 may be a fixed-wing aircraft (e.g., an airplane), as shown in FIG. 1. Moreover, the aircraft may be a manned aerial vehicle or an unmanned aerial vehicle (UAV, e.g., a drone).

The propulsion system 20 of FIG. 1 includes a rotational assembly 22, one or more auxiliary loads 24, and an electrical power source 26. The rotational assembly 22 includes an electric motor assembly 28, a reduction gearbox (RGB) module 30, an accessory gearbox (AGB) module 32, and a propulsor 34 (e.g., a propeller) disposed along an axial centerline 36 (e.g., a rotational axis) of the propulsion system 20.

The electric motor assembly 28 includes an electric motor 38 and a motor housing 40. The electric motor 38 is electrically connected to the electrical power source 26. For example, the electric motor 38 is configured to receive electrical power from the electrical power source 26 for operation of the electric motor 38. The electric motor 38 may additionally be configured to direct electrical power to the electrical power source 26 (e.g., the electric motor 38 may be configured to operate as an electrical generator). The electric motor 38 may be configured as an alternating current (AC) electric motor or a direct current (DC) electric motor. For example, the electric motor 38 may be configured as a synchronous electric motor, an induction motor (e.g., an asynchronous electric motor), a permanent magnet electric motor, or the like, and the present disclosure is not limited to any particular electric motor configuration. The electric motor assembly 28 may further including other electrical control and/or conditioning equipment and components such as, but not limited to, an inverter, a motor controller, AC/DC conversion equipment, and/or the like.

The electric motor 38 of FIG. 1 includes a rotor 42 and a stator 44. The rotor 42 is configured for rotation about the axial centerline 36. The rotor 42 includes a rotor body 46. The rotor 42 may additionally include a first output shaft 48 and/or a second output shaft 50. The rotor body 46 is disposed in the motor housing 40. The rotor body 46 extends (e.g., axially extends) between and to a first axial end 52 of the rotor body 46 and a second axial end 54 of the rotor body 46. The first output shaft 48 is disposed at (e.g., on, adjacent, or proximate) the first axial end 52. The first output shaft 48 extends along the axial centerline 36 axially outward from the first axial end 52. For example, the first output shaft 48 may extend through the motor housing 40 to the RGB module 30. The second output shaft 50 is disposed at (e.g., on, adjacent, or proximate) the second axial end 54. The second output shaft 50 extends along the axial centerline 36 axially outward from the second axial end 54. For example, the second output shaft 50 may extend through the motor housing 40 to the AGB module 32. The first output shaft 48 and the second output shaft 50 are coaxial with respect to the axial centerline 36. The stator 44 of FIG. 1 extends circumferentially about (e.g., completely around) the axial centerline 36 and the rotor body 46 in the motor housing 40.

The motor housing 40 is configured to support and house the electric motor 38. The motor housing 40 may extend circumferentially about (e.g., completely around) the axial centerline 36. The motor housing 40 extends (e.g., axially extends) between and to a first axial end 56 of the motor housing 40 and a second axial end 58 of the motor housing 40. The motor housing 40 may include or otherwise form a first flange 60 and a second flange 62. The first flange 60 may be disposed at (e.g., on, adjacent, or proximate) the first axial end 56. The first flange 60 may be mounted to the RGB module 30 (e.g., a gearbox case of the RGB module 30). The second flange 62 may be disposed at (e.g., on, adjacent, or proximate) the second axial end 58. The second flange 62 may be mounted to the AGB module 32 (e.g., a gearbox case of the AGB module 32). The motor housing 40 may additionally include one or more bearing assemblies for rotatably supporting the rotor 42 and its output shafts 48, 50.

Figure 2:
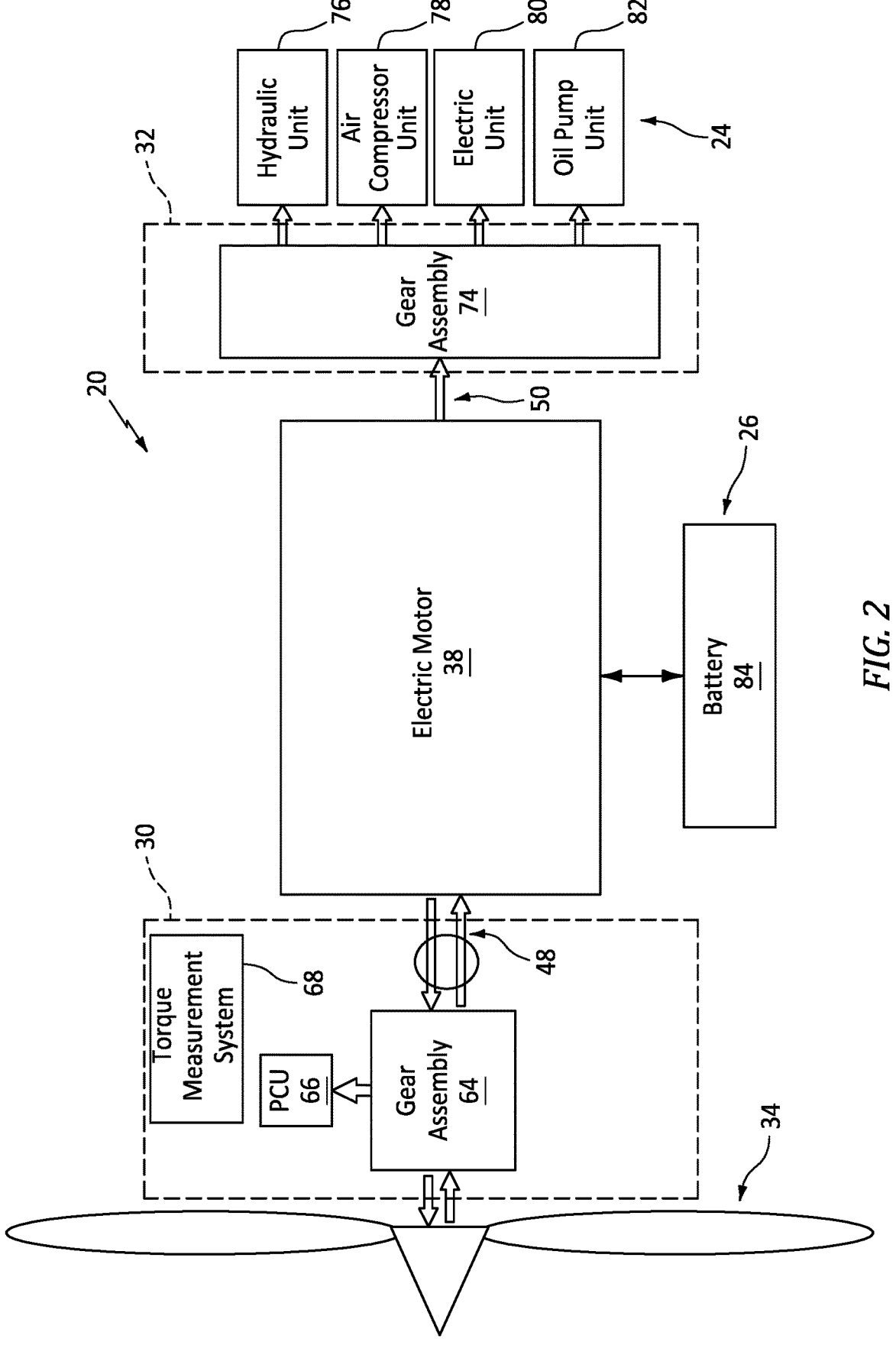
FIG. 2 illustrates a block diagram of the electric propulsion system of FIG. 1, in accordance with one or more embodiments of the present disclosure.

Referring now to FIGS. 1 and 2, the RGB module 30 of FIG. 2 includes a reduction gear assembly 64. The reduction gear assembly 64 is coupled with the rotor body 46 at (e.g., on, adjacent, or proximate) the first axial end 52. For example, the reduction gear assembly 64 may be coupled with the first output shaft 48. The reduction gear assembly 64 is additionally coupled with the propulsor 34 (e.g., an input shaft of the propulsor 34). The reduction gear assembly 64 is configured to drive the propulsor 34 at a reduced rotational speed relative to the rotor body 46 (e.g., the first output shaft 48). In other words, the reduction gear assembly 64 is configured to facilitate a reduced speed ratio of the propulsor 34 relative to the rotor body 46. The reduction gear assembly 64 may additionally be configured to drive rotation of the rotor 42 based on rotation of the propulsor 34, as will be discussed in further detail. The reduction gear assembly 64 may be configured, for example, as a planetary gear assembly or other epicyclic gear assembly. However, the present disclosure is not limited to any particular configuration of the reduction gear assembly 64. The RGB module 30 may additionally include a propeller control unit (PCU) 66 and/or a torque measurement system 68. For configurations of the propulsion system 20 in which the propulsor 34 includes variable-pitch propeller blades, the PCU 66 may control (e.g., modulate) the pitch of the propeller blades. For example, the PCU 66 may control the pitch of the propeller blades to achieve a desired thrust of the propulsion system 20 while the propulsor 34 rotation speed remains constant or substantially constant (e.g., a constant-speed propeller assembly). The torque measurement system 68 may measure a torque of the rotational assembly 22. For example, the torque measurement system 68 may measure a torque applied by the first output shaft 48 to the reduction gear assembly 64 or otherwise generate an output signal representative of the torque, which torque output signal may be used by one or more control systems for monitoring and/or control of propulsion system 20 functions (e.g., propeller blade pitch control).

The propulsor 34 is configured for rotation about a rotational axis. The rotational axis of the propulsor 34 may be the axial centerline 36 as shown in FIG. 1, or another rotational axis which is different than the axial centerline 36. The propulsor 34 of FIG. 1 is configured as a propeller. For example, the propulsor 34 of FIG. 1 includes a hub 70 and a plurality of propeller blades 72. The propeller blades 72 are mounted to the hub 70. The propeller blades 72 are circumferentially distributed about the hub 70, for example, relative to the axial centerline 36. The propeller blades 72 may be configured as variable-pitch propeller blades. For example, the propeller blades 72 may each be rotatable about a lengthwise axis to control (e.g., selectively vary) a pitch (e.g., an angle; sometimes referred to as a "beta angle") of the propeller blades 72. However, the present disclosure is also applicable to fixed-pitch propeller blades. The present disclosure, however, is not limited to propeller configurations for the propulsor 34 and the propulsor 34 may also be configured as a fan (e.g., for a turbofan propulsion system), an open rotor propulsor, or another configuration of aircraft propulsion rotor.

The AGB module 32 of FIG. 2 includes a gear assembly 74. The gear assembly 74 is coupled with the rotor body 46 at (e.g., on, adjacent, or proximate) the second axial end 54. For example, the gear assembly 74 may be coupled with the second output shaft 50. The gear assembly 74 is additionally coupled with the auxiliary loads 24. The gear assembly 74 is configured to drive each of the auxiliary loads 24 in response to rotation of the second output shaft 50. The gear assembly 74 may be configured as a speed-changing gear assembly to drive the auxiliary loads 24 at a different (e.g., faster or slower) rotational speed relative to the second output shaft 50. The gear assembly 74 may additionally be configured to drive each auxiliary load 24 at a different rotational speed relative to others of the auxiliary loads 24.

The auxiliary loads 24 facilitate one or more support functions of the aircraft 1000 or its propulsion system 20. For example, the auxiliary loads 24 of FIG. 2 include a hydraulic unit 76, an air compressor unit 78, an electrical unit 80 (e.g., a low-voltage generator), and an oil pump unit 82. The present disclosure, however, is not limited to the aforementioned exemplary auxiliary loads 24 and the auxiliary loads 24 may include additional or alternative rotational loads driven by the AGB module 32 and its gear assembly 74. The air compressor unit 78 may supply high-pressure air for the aircraft 1000 and/or its propulsion system 20. For example, the high-pressure air may be supplied to an environmental control system (ECS) of the aircraft 1000, for pneumatic systems of the aircraft 1000 and/or the propulsion system 20, for air cooling systems, etc.

The electric power source 26 is electrically connected to the electric motor 38 to supply electric power to the electric motor 38 for driving the RGB module 30 and the AGB module 32. The electric power source 26 may include an electric generating source such as, but not limited to, an auxiliary power unit (APU) or a fuel cell generator (e.g., a hydrogen fuel cell generator). The electric power source 26 may additionally or alternatively include an electric power storage device such as, but not limited to, one or more batteries and/or one or more capacitors. For example, the electric power source 26 of FIG. 2 includes a battery 84. The present disclosure is not limited to any particular configuration of the electric power source 26 provided the electric power source 26 can supply electric power to the electric motor 38 for operation of the electric motor. The electric power source 26 may be disposed in the propulsion system 20 or the aircraft 1000 on which the propulsion system 20 is mounted.

In operation, the rotor 42 and its output shafts 48, 50 rotate together about the axial centerline 36 to drive the RGB module 30 (e.g., the reduction gear assembly 64) and the AGB module 32 (e.g., the gear assembly 74), thereby driving the propulsor 34 and the auxiliary loads 24, respectively. In addition, during some operating conditions of the propulsion system 20, the electric motor 38 may operate as a generator to generate electrical power (e.g., for storage in the battery 84). For example, during a descent flight condition of the aircraft 1000 (see FIG. 1), oncoming air may drive rotation of the propulsor 34 and, thus, the electric motor 38 via the RGB module 30.

The present disclosure electric motor 38 may facilitate conversion of a gas turbine engine propulsion system to an electric propulsion system (e.g., a propulsion system using only electrical power for propulsion). In particular, the configuration of the RGB module 30, the AGB module 32, and the electric motor 38 may facilitate reduced complexity and propulsion system downtime, for example, where propulsion system gearboxes (e.g., the RGB module 30 and the AGB module 32) are axially aligned (e.g., along the axial centerline 36) to receive respective drive shafts (e.g., the first output shaft 48 and the second output shaft 50).

Figure 3:
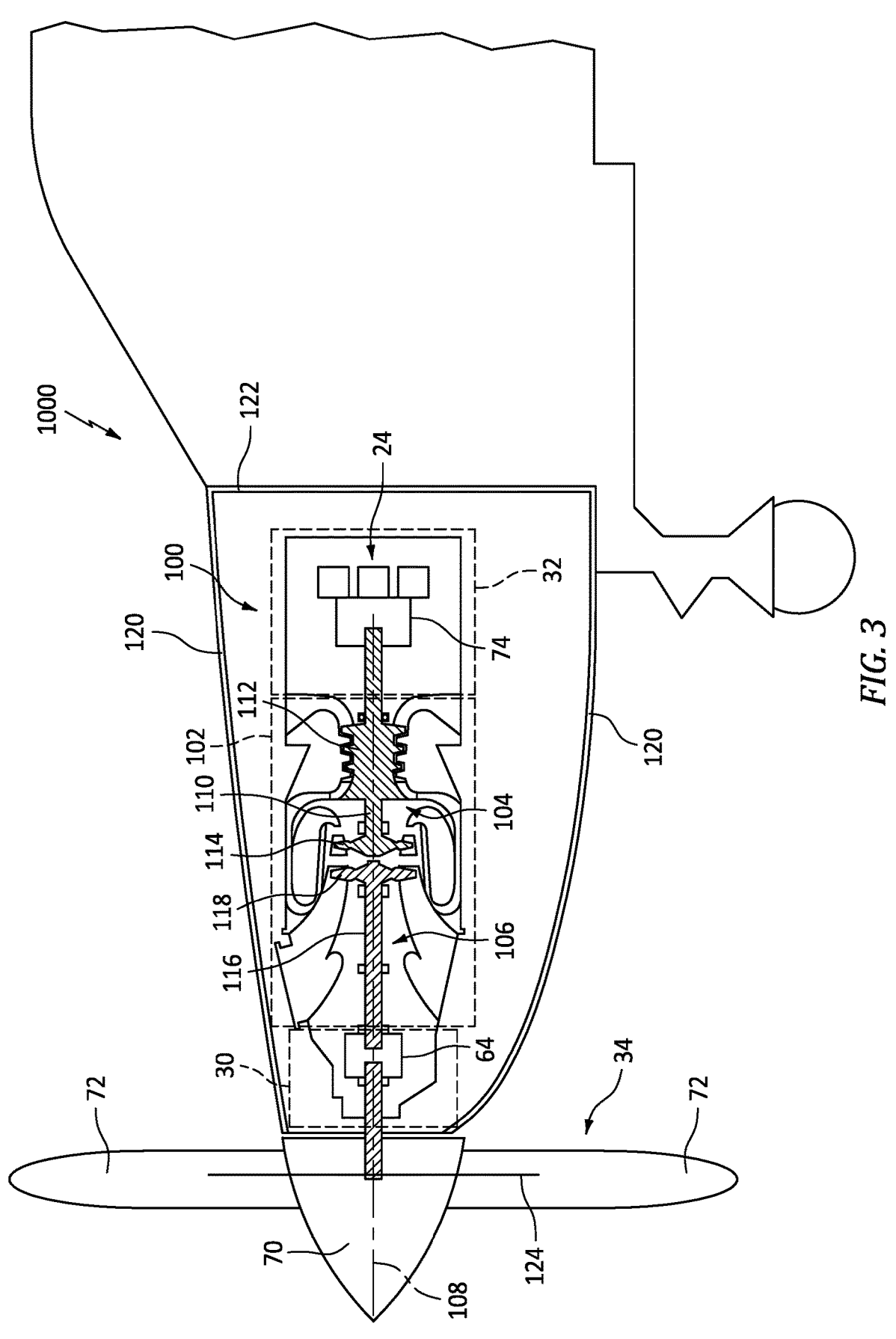
FIG. 3 illustrates a side, cutaway view of a portion of an aircraft including a gas turbine engine propulsion system, in accordance with one or more embodiments of the present disclosure.

FIG. 3 illustrates an exemplary propulsion system 100 which may be modified in accordance with aspects of the present disclosure. The propulsion system 100 of FIG. 3 includes a gas turbine engine 102. The gas turbine engine 102 of FIG. 3 includes a first rotational assembly 104 and a second rotational assembly 106 arranged sequentially along an axial centerline 108 of the gas turbine engine 102. The first rotational assembly 104 and the second rotational assembly 106 of FIG. 3 form a "free turbine" configuration of the gas turbine engine 102 in which the first rotational assembly 104 is axially displaced from the second rotational assembly 106. The first rotational assembly 104 (e.g., a high-pressure spool) includes a first shaft 110, a bladed compressor rotor 112, and a bladed first turbine rotor 114. The first shaft 110 interconnects the bladed compressor rotor 112 and the bladed first turbine rotor 114. The first shaft 110 is coupled with the AGB module 32. Rotation of the bladed first turbine rotor 114 about the axial centerline 108 drives the AGB module 32 (e.g., the gear assembly 74; see FIG. 2). The second rotational assembly 106 (e.g., a low-pressure spool or a power spool) includes a second shaft 116 and a bladed second turbine rotor 118. The second shaft 116 is connected to the bladed second turbine rotor 118. The second shaft 116 is coupled with the RGB module 30. Rotation of the bladed second turbine rotor 118 about the axial centerline 108 drives the RGB module 30 (e.g., the reduction gear assembly 64; see FIG. 2) to drive rotation of the propulsor 34 and generate thrust for the propulsion system 100.

Still referring to FIG. 3, the propulsion system 100 may have a number of shape and/or size constraints which may further complicate conversion to an electric propulsion system configuration. For example, a housing 120 (e.g., nacelle) of the propulsion system 100 may have an aerodynamic shape to facilitate optimal propulsor 34 thrust efficiency, pilot visibility, and aerodynamic drag. Accordingly, modification a size and/or shape of the housing 120 to accommodate an electric propulsion system configuration may be undesirable. Moreover, modification or replacement of the housing 120 to accommodate an electric propulsion system configuration may be expensive and time consuming. The aircraft 1000 may include a cabin firewall 122 between the propulsion system 100 and occupied areas of the aircraft 1000, which cabin firewall 122 may limit an axial extent of an electric propulsion system configuration. The location of the propulsor 34 (e.g., a propeller plane axial position 124) may further limit the axial extend of an electric propulsion system configuration. In accordance with the present disclosure, the electric motor 38 may be used to replace the gas turbine engine 102 for driving the RGB module 30 and the AGB module 32 while fitting within the narrow allowable space which may be available for at least some propulsion system configurations. In other words, the gas turbine engine 102 may be removed from the propulsion system 100 and the electric motor 38 may be installed and coupled with the RGB module 30 and the AGB module 32 while facilitating significantly reduced cost, complexity and downtime for the propulsion system 100.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f)

unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for a propulsion system of an aircraft, the assembly comprising:
    an electric motor including a rotor, the rotor includes a first axial end and a second axial end;
    a first gearbox module including a first gear assembly, the first gear assembly is coupled to the first axial end;
    a second gearbox module including a second gear assembly, the second gear assembly is coupled to the second axial end; and
    a propeller coupled to the first gear assembly, the first gear assembly is configured to drive rotation of the propeller in response to rotation of the rotor;
    wherein the electric motor includes a motor housing, the motor housing extends between and to a first axial motor end and a second axial motor end, the second axial motor end opposite the first axial motor end, the motor housing includes a first flange at the first axial motor end and a second flange at the second axial motor end, the first flange is mounted to the first gearbox module, and the second flange is mounted to the second gearbox module.

2. The assembly of claim 1, wherein the rotor includes a rotor body, a first output shaft, and a second output shaft, the rotor body extends between and to the first axial end and the second axial end, the first output shaft is disposed at the first axial end, and the second output shaft is disposed at the second axial end.

3. The assembly of claim 2, wherein the first output shaft and the second output shaft are rotatable about a rotational axis.

4. The assembly of claim 3, wherein the first output shaft and the second output shaft rotate are rotatable together about the rotational axis.

5. The assembly of claim 1, wherein the first gear assembly is a reduction gear assembly.

6. The assembly of claim 1, further comprising a plurality of auxiliary loads coupled to the second gear assembly, the second gear assembly configured to drive the plurality of auxiliary loads in response to rotation of the rotor.

7. The assembly of claim 6, wherein the plurality of auxiliary loads includes an air compressor.

8. The assembly of claim 1, wherein the propeller is a variable-pitch propeller.

9. A method for forming an electric motor propulsion system for an aircraft, the method comprising:

for a propulsion system including a first gearbox module, a second gearbox module, and a gas turbine engine, the first gearbox module including a first gear assembly, the second gearbox module including a second gear assembly, the gas turbine engine including at least one rotational assembly coupled with the first gear assembly and the second gear assembly, the at least one rotational assembly rotatable about a rotational axis to drive the first gear assembly and the second gear assembly, performing the steps of:

removing the gas turbine engine from an installation location of the propulsion system; and forming the electric motor propulsion system by installing an electric motor in the propulsion system at the installation location subsequent to removing the gas turbine engine from the propulsion system, and coupling a rotor of the electric motor with the first gear assembly and the second gear assembly;

wherein the electric motor includes a motor housing, the motor housing extends between and to a first axial motor end and a second axial motor end, the second axial motor end opposite the first axial motor end, the motor housing includes a first flange at the first axial motor end and a second flange at the second axial motor end, the first flange is mounted to the first gearbox module, and the second flange is mounted to the second gearbox module.

10. The method of claim 9, wherein the at least one rotational assembly includes a first rotational assembly and a second rotational assembly, the first rotational assembly coupled to the first gear assembly and the second rotational assembly coupled to the second gear assembly.

11. The method of claim 9, wherein the rotor includes a first output shaft and a second output shaft, and coupling the rotor of the electric motor with the first gear assembly and the second gear assembly includes coupling the first shaft with the first gear assembly and coupling the second shaft with the second gear assembly.

12. An aircraft propulsion system comprising:

an electric motor including a rotor rotatable about a rotational axis;

a first gearbox module including a first gear assembly, the first gear assembly is coupled to rotor;

a second gearbox module including a second gear assembly, the second gear assembly is coupled to the rotor;

a propulsor coupled to the first gear assembly, the first gear assembly is configured to drive rotation of the propulsor in response to rotation of the rotor; and a plurality of auxiliary loads coupled to the second gear assembly, the second gear assembly configured to drive the plurality of auxiliary loads in response to rotation of the rotor;

wherein the electric motor includes a motor housing, the motor housing extends between and to a first axial end and a second axial end, the second axial end opposite the first axial end, the motor housing includes a first flange at the first axial end and a second flange at the second axial end, the first flange is mounted to the first gearbox module, and the second flange is mounted to the second gearbox module.

13. The aircraft propulsion system of claim 12, wherein the rotor includes a rotor body, a first output shaft, and a second output shaft, the rotor body extends between and to a first axial end and a second axial end, the first output shaft is disposed at the first axial end, the first output shaft is coupled to the first gear assembly, the second output shaft is disposed at the second axial end, and the second output shaft is coupled to the second gear assembly.

14. The aircraft propulsion system of claim 13, wherein the first output shaft and the second output shaft are rotatable about the rotational axis.

15. The aircraft propulsion system of claim 13, wherein the first output shaft and the second output shaft are rotatable together about the rotational axis.

16. The aircraft propulsion system of claim 12, wherein the electric motor is positioned axially between the first gearbox module and the second gearbox module.

17. The assembly of claim 1, wherein the first gearbox module comprises a reduction gearbox module;

the second gearbox module comprises an accessory gearbox module; and the electric motor is positioned axially between the reduction gearbox module and the accessory gearbox module.

18. The assembly of claim 1, wherein the motor housing extends circumferentially about and axially along the electric motor.

* * * * *